Sept. 28, 1943.  C. L. EKSERGIAN  2,330,790
DIFFERENTIAL WHEEL
Filed July 18, 1940
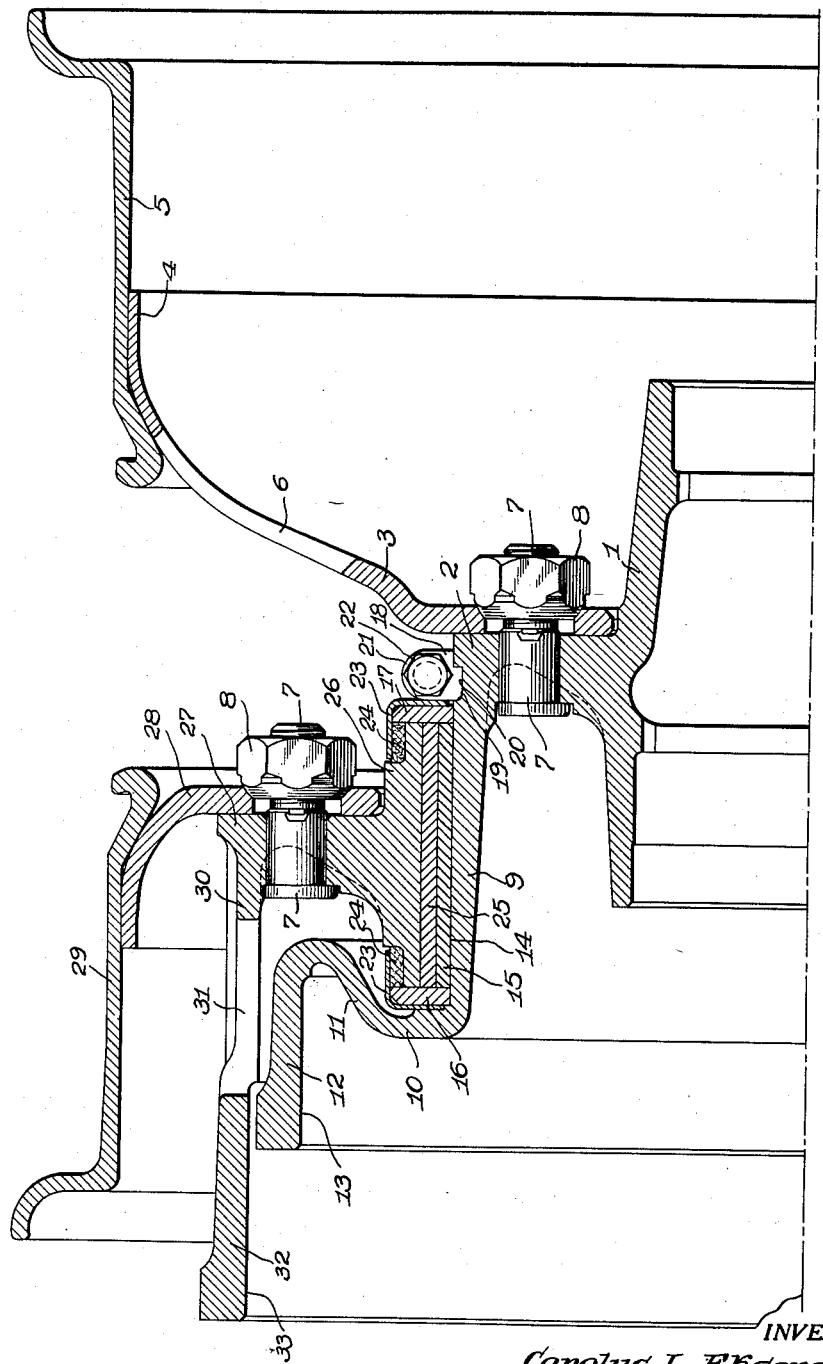
INVENTOR
Carolus L. Eksergian
BY John P. Jackup
ATTORNEY Patented Sept. 28, 1943

2,330,790

UNITED STATES PATENT OFFICE 2,330,790

DIFFERENTIAL WHEEL

Carolus L. Eksergian, Detroit, Mich., assignor to Budd Wheel Company, Philadelphia, Pa., a corporation of Pennsylvania Application July 18, 1940, Serial No. 346,077

5 Claims. (Cl. 188—18)

The present invention relates to dual wheels, that is, wheels arranged in pairs to share a heavy load.

An object of the invention is to provide means whereby the two wheels constituting said pair may normally act as a unit, that is, turn synchronously with one another, but may also be capable of independent rotation to serve a purpose similar to that performed by a differential in an automotive or other vehicle.

When the two wheels constituting a dual wheel carry tires of relatively large size, and of considerable lateral separation from one another, it is obvious that when the vehicle makes a turn there will be considerable slipping of one or both tires on the roadway when the wheels are rigidly attached to one another, as is at present customary, resulting in rapid wearing out of the tires and also decreasing the ease of response of the wheels when traveling in a curve and increasing the tendency to loss of traction and/or skidding.

In accordance with the present invention one of the wheels is carried rigidly on the hub in the customary way, while the other wheel is mounted so as to be free to turn with respect to the hub, and each of these wheels is provided with its own individual brake drum. Due to the fact that one of the wheels thus can rotate with respect to the other, about the axis of the hub, it is true that it cannot transmit as much driving force as the other one, however it nevertheless will support its full share of the weight of the load. The duel wheel however is fully effective when used as a non-drive wheel.

Owing to the provision of a brake drum rigid with each wheel, together with corresponding brake shoes for engaging said drums, each wheel can exert its proper share of the braking effort.

The invention will be understood clearly from the accompanying drawing, the single figure of which is a diagrammatic axial section through one radial half of a dual wheel embodying the invention.

The hub 1 has a circumferential flange 2, which receives the web or flange 3 forming part of a dished or bell-shaped wheel structure, with a substantially cylindrical flange 4 carrying the conventional tire-receiving rim 5. Perforations 6 may be provided at intervals in the web 3 to allow circulation of air, to assist in preventing overheating of the tires and brakes of the dual wheel. The flange 3 is mounted on the flange 2 in any desired way, as by the customary bolts 7 and nuts 8, so that the entire outer wheel may thus be dismounted from the hub 1 when requisite.

Formed integral with the circumferential flange 2, or otherwise secured thereto, is the inwardly extending cylindrical flange 9, which terminates at a radially extending web 10, which is again outwardly bent as at 11, and then terminates in the cylindrical brake drum 12 having the internal braking surface 13. The structure thus far described thus constitutes a mounting means or wheel for a single tire, having a hub and a brake drum rigidly connected therewith.

The cylindrical flange 9 has a trued outer surface 14, for receiving the mounting means of the other wheel. This comprises a cylindrical sleeve 15, with annular end flanges 16 and 17 which are positioned over the said cylindrical surface 14 as clearly shown, and held in position by a suitable retaining device such as the split ring 18 encircling the periphery of the radial flange 2, said flange preferably having a groove 19 therein to receive a corresponding annular projection 20 of the ring 18.

The ring 18 may be locked in position by means of the ears 21, through which passes a suitable securing bolt 22, thus permitting ready removal of the split ring whenever desired. Cup-shaped retainers 23, each consisting of a radial annular flange and a cylindrical annular flange, and fitting respectively over the rings 16 and 17, may be located as shown to retain felt or other washers 24 which serve to retain grease or other lubricant and seal the joint against entrance of dirt or water in operation. Mounted upon the bushing 15 is another bushing 25, which is preferably very slightly shorter than the bushing 15, for clearance and which may turn freely but snugly on said bushing 15, said bushings preferably being of different materials so as to decrease the friction and wear between them. One of these bushings, as 15, may be of hard material such as steel and the other, 25, of suitable softer bearing material, for example, brass.

Mounted on the outer cylindrical surface of the sleeve or bushing 25 is the hub 26, for carrying the remaining wheel. This hub has a radial flange 27 for carrying the web or bell 28 which supports the tire-carrying rim 29, secured thereto in any desired way. The flanges 27 and 28 are removably secured to one another by bolts 7 and nuts 8 identical with those securing the other wheel to the hub 1. Extending axially inward from the circumferential flange 27 is the cylindrical flange 30, which may have a series of apertures such as 31 therein for the passage of air, and which terminates in the brake drum 32, having the internal braking surface 33.

The operation of the mechanism herein described is obvious from the structure thereof. The outer wheel, having the tire-carrying rim 5, is secured directly to the hub 1 which also carries the brake drum 12 intended to cooperate with an internal brake shoe, so that said outer wheel will thus operate in the conventional way.

The inner wheel, comprising the rim 29, will normally rotate in unison with the hub 1 so that the tire carried by the rim 29 will share the load with the tire on rim 5 during the normal straight travel of the vehicle. It will also transmit a certain amount of power to said tire, determined by the amount of friction produced between the bushing 25 and the members inside and outside of said bushing.

However when the vehicle turns, a differential effect will arise because of the lateral separation of the two tires, the one at the outside of the curve tending to turn more rapidly than the other. This will cause the frictional mounting to slip, permitting the two tires to travel at different rates and preventing undue wear or resistance to turning.

The inner wheel also will assist in the braking, by reason of the brake shoe acting on the friction surface 33 of the brake drum 32 so that both wheels will thus contribute to the braking effect, while the traction is provided mainly by the outer wheel. The openings 6 and 31 will permit air to flow adjacent the brake drums and tires to assist in dissipating the heat produced by operation of the vehicle. The openings 6 also give access to the securing means for the inner wheel without requiring demounting of the outer wheel.

While a preferred form of the invention has been disclosed in detail, it is obvious that the principle of the invention may be embodied in many other structural types, and the scope of the invention is therefore defined solely in the following claims.

I claim:

1. A dual wheel assembly comprising a hub having an integral radial flange, the periphery of said flange being integrally extended by an axially extending portion forming an annular bearing seat and the inner end of said axially extending portion being integrally formed with a brake drum, a second hub rotatably mounted on said seat and having a radial hub flange integral therewith and a second brake drum secured to said last-named flange, a wheel demountably secured to each radial flange and means accessible from the outboard side for securing each wheel to its respective radial flange.

2. A dual wheel assembly comprising a hub having a barrel, a radial flange extending from said hub barrel, said flange terminating radially outwardly in an axially inwardly extending portion providing an annular bearing seat, a brake drum secured to the axially inner end of said portion, a wheel demountably bolted onto the outboard face of said flange, a second hub rotatably mounted on said bearing seat and having a radial flange, a second brake drum secured to said last-named radial flange, and a second wheel demountably bolted onto the outboard face of said last-named flange, whereby both wheels are readily demountable from the outboard side of the wheel assembly by merely releasing their bolting on means.

3. A dual wheel assembly comprising a hub having a barrel and a radial flange extending from said barrel, said flange terminating radially outwardly in an axially inwardly extending portion providing an annular bearing seat, a brake drum secured to the axially inner end of said portion, a wheel demountably bolted onto the outboard face of said flange, a second hub mountable from the outboard side of the wheel on said axially extending annular seat for independent rotation thereon, removable means for securing said second hub in place on said seat, a radial flange on said second hub, and a second brake drum and a second wheel secured to said second-named radial flange, the second wheel being demountably bolted onto the outboard face of said second-mentioned flange, whereby both wheels and the second hub are readily demountable from the outboard side of the wheel assembly.

4. A dual wheel assembly according to claim 3 in which said removable means comprises a split ring encircling the first-mentioned flange and having a portion seated in a groove in said flange.

5. A dual wheel assembly comprising a hub having a barrel and a radial flange extending therefrom, said flange having secured to its outer periphery a portion extending axially inwardly and providing an annular bearing seat, a brake drum secured to the axially inner end of said portion, a first wheel demountably bolted on to the outboard face of said flange, a second hub rotatably mounted on said axially extending bearing seat and having a radial flange, a second brake drum and a second wheel secured to said last-named flange, said second wheel being demountably bolted on to the outboard face of said second-named flange, the first wheel being provided with perforations through which access may be had for securing the second wheel without demounting the first wheel.

CAROLUS L. EKSERGIAN.